United States Patent
Sebetlela

(10) Patent No.: US 12,551,969 B2
(45) Date of Patent: Feb. 17, 2026

(54) WELDING DEVICE AND WELDING METHOD FOR PRODUCING A MATERIAL BOND CONNECTION BETWEEN A CONDUCTOR AND A CONNECTING PART

(71) Applicant: Auto-Kabel Management GmbH, Hausen i.W. (DE)

(72) Inventor: Kabelo Sebetlela, Landshut (DE)

(73) Assignee: Auto-Kabel Management GmbH, Hausen i.W. (DE)

( * ) Notice: Subject to any disclaimer, the term of this patent is extended or adjusted under 35 U.S.C. 154(b) by 76 days.

(21) Appl. No.: 17/785,726

(22) PCT Filed: Nov. 2, 2020

(86) PCT No.: PCT/EP2020/080621
§ 371 (c)(1),
(2) Date: Jun. 15, 2022

(87) PCT Pub. No.: WO2021/121752
PCT Pub. Date: Jun. 24, 2021

(65) Prior Publication Data
US 2023/0045927 A1    Feb. 16, 2023

(30) Foreign Application Priority Data

Dec. 17, 2019    (DE) .................... 10 2019 134 763.7

(51) Int. Cl.
*B23K 20/10*    (2006.01)
*B23K 103/10*   (2006.01)
(Continued)

(52) U.S. Cl.
CPC .......... *B23K 20/10* (2013.01); *B23K 2101/38* (2018.08); *B23K 2103/10* (2018.08); *B23K 2103/12* (2018.08)

(58) Field of Classification Search
None
See application file for complete search history.

(56) References Cited

U.S. PATENT DOCUMENTS 6,167,616 B1 * 1/2001 Shinchi .............. H01R 43/0207
174/92
9,496,670 B2 * 11/2016 Wagner .................. H01R 4/021
(Continued)

FOREIGN PATENT DOCUMENTS

CN    1203468 A    12/1998
CN    1902022 A     1/2007
(Continued)

OTHER PUBLICATIONS

International Searching Authority/European Patent Office, International Search Report and Written Opinion of the International Searching Authority, Application No. PCT/EP2020/080621, mailed Feb. 19, 2021, 11 pages (with English translation of the International Search Report).

(Continued)

*Primary Examiner* — Devang R Patel
(74) *Attorney, Agent, or Firm* — Merchant & Gould P.C.

(57) ABSTRACT

The subject matter relates to a welding device as well as a welding method for producing a material bond connection (Continued)

between a conductor (10) and a connecting part (8), with at least one ultrasonic welding tool (4), wherein at least part of a contact surface (18) of the connecting part (8) contacts at least part of a contact surface (16) of the ultrasonic welding tool (4).

6 Claims, 2 Drawing Sheets

(51) Int. Cl.
*B23K 103/12* (2006.01)
*B23K 101/38* (2006.01)

(56) References Cited

U.S. PATENT DOCUMENTS

| | | | |
|---|---|---|---|
| 2006/0169388 A1 | 8/2006 | Shimizu et al. | |
| 2008/0128471 A1* | 6/2008 | Eberbach | B23K 20/106 228/1.1 |
| 2014/0014709 A1* | 1/2014 | Takayashiki | B23K 20/10 228/110.1 |
| 2016/0052081 A1 | 2/2016 | Regenberg | |
| 2019/0131753 A1* | 5/2019 | Idota | H01R 43/0263 |
| 2019/0207354 A1* | 7/2019 | Takada | B23K 33/00 |

FOREIGN PATENT DOCUMENTS

| | | | |
|---|---|---|---|
| CN | 101772866 A | 7/2010 | |
| CN | 104955604 A | 9/2015 | |
| DE | 102007026707 B3 * | 9/2008 | ........... B23K 20/106 |
| DE | 10 2017 106 742 B3 | 3/2018 | |
| EP | 3 419 121 A1 | 12/2018 | |
| JP | 2006-181623 A | 7/2006 | |
| JP | 2016185009 A * | 10/2016 | |
| JP | 2017162635 A * | 9/2017 | ............ B23K 20/10 |
| WO | WO 2018/177616 A1 | 10/2018 | |
| WO | WO 2018/210603 A1 | 11/2018 | |

OTHER PUBLICATIONS

German Patent Office, Office Action, Application No. 10 2019 134 763.7, mailed Sep. 2, 2020, 4 pages (in German).

National Intellectual Property Administration, PRC, Notification of the First Office Action, Application No. 202080093230.0, dated Feb. 8, 2023, 12 pages.

* cited by examiner

WELDING DEVICE AND WELDING METHOD FOR PRODUCING A MATERIAL BOND CONNECTION BETWEEN A CONDUCTOR AND A CONNECTING PART

CROSS-REFERENCE TO RELATED APPLICATIONS

This application is the national phase entry of international patent application no. PCT/EP2020/080621 filed Nov. 2, 2020 and claims the benefit of German patent application No. 10 2019 134 763.7, filed Dec. 17, 2019, the disclosures of which are incorporated herein by reference in their entirety.

TECHNICAL FIELD

The subject matter relates to a welding device as well as a welding method for producing a material bond between a conductor and a connecting part, with at least one ultrasonic welding tool, in particular with at least one sonotrode or at least one anvil, wherein at least part of a contact surface of the connecting part contacts at least part of a contact surface of the ultrasonic welding tool. The aforementioned welding connection between conductor and connecting part will be used in particular in automotive applications, preferably in the connection of conductors, in particular flat conductors, with connecting parts, in particular with flat parts.

BACKGROUND ART

The welding of conductors and connecting parts to each other by means of ultrasonic welding processes is sufficiently well known. In an ultrasonic welding process, an ultrasonic vibration is introduced by a sonotrode into one of the components to be welded together. This ultrasonic vibration causes the two components to be welded to move relative to each other at their contact surfaces. This relative movement results in friction and ultimately in welding of the surfaces of the two components to be welded together at a welding surface.

This type of welding is particularly useful when welding aluminum contact parts, since ultrasonic welding breaks up an aluminum oxide layer on the contact surface between the components to be welded. Ultrasonic welding plasticizes at least one of the two components to be welded together at the contact surface, resulting in a material bond.

In ultrasonic welding processes known from the prior art as well as ultrasonic welding devices, it is usual to first arrange a connecting part on an ultrasonic welding tool, in particular on a sonotrode or on an anvil, and then to fix the connecting part on the ultrasonic welding tool, in particular on a lower ultrasonic welding tool, by means of a frictional connection. However, such a process is disadvantageous in that it can compensate for production-related manufacturing tolerances of the connecting part only to a limited extent. The production-related manufacturing tolerances of the connecting parts to be welded mean that repeatable positioning of the connecting parts on the ultrasonic welding tool is only possible to an inadequate extent.

Furthermore, the welding method used for welding connecting parts and conductors can be selected as a function of the welding path. The welding path can be defined as the distance covered by the ultrasonic welding tool from the first contact with the conductor and/or the connecting part to the end of the welding cycle. Depending on the hardness and stiffness of the joining partners used, the welding path can be as low as 0.2 mm, for example. Due to the production-related manufacturing tolerances of the connecting parts and/or the conductors, the welding path can deviate by up to 0.3 mm compared to a connecting part with a completely flat contact surface and/or a conductor with a completely flat contact surface. Thus, it is critical for the process reliability and process repeatability of the ultrasonic welding process that such deviations of the weld path are avoided.

Furthermore, it is common for the connecting parts to be fixed to the ultrasonic welding tool by means of a force fit. This is usually accomplished by means of clamping the connection elements, whereby at least two surfaces of the connecting part that are not to be welded are clamped by means of pressing means. These surfaces of the connecting means are also not completely flat, but have certain process-related manufacturing tolerances and/or surface roughnesses, so that the position-related deviation of the connecting parts on the ultrasonic tool is further increased as a result.

SUMMARY OF THE INVENTION

The subject matter was therefore based on the object of specifying a welding device and a welding process that enable reproducible and reliable welding of a connecting part to a conductor.

This task is solved by a welding device as set forth in the claims and by a welding method as set forth in the claims.

A welding device for producing a material connection between a conductor and a connecting part, having at least one ultrasonic welding tool, wherein at least a part of a contact surface of the connecting part contacts at least a part of a contact surface of the ultrasonic welding tool, is sufficiently known.

In such an apparatus, an ultrasonic welding tool, in particular a sonotrode or an anvil, is moved onto another ultrasonic welding tool, in particular an anvil or a sonotrode. The sonotrode is excited with ultrasonic vibration via an ultrasonic converter and an optional booster. With the aid of the contact force of the sonotrode or anvil on the connector or conductor, the ultrasonic vibration is introduced into the connector or conductor. Welding occurs in the area of the contact surfaces of the connecting part and the conductor that are in contact.

To apply the contact force, which makes it possible to introduce the ultrasonic vibration, the horn is moved in the direction of the anvil by means of a feed device. It is also possible that the sonotrode is fixed and the anvil is moved in the direction of the sonotrode. In this respect, a feed device by which the sonotrode and the anvil are movable relative to each other is proposed. The linear movement of the feed device preferably leads to two end positions, namely an open position and a final welding position. Between these two positions, the horn and anvil are movable relative to each other.

The contact surfaces of the connecting part and the ultrasonic welding tool are defined as those surfaces which are designed to be in contact with the ultrasonic welding tool or the connecting part. At least parts of these contact surfaces are formed in such a way that they have profiles corresponding essentially to one another and/or are formed in such a way that they can engage in one another at least partially in a form-fitting manner.

A profiling in the sense of the application is any surface condition that exceeds usual surface tolerances and/or usual surface roughnesses of the contact surfaces of the ultrasonic welding tool and/or the connecting part. In this context, it is preferred that the profiles of the connecting part and of the ultrasonic welding tool are formed in such a way that the profiles at least partially engage in one another in a form-fitting manner and/or correspond substantially to one another.

As a result, the effective surface in contact between the connecting part and the ultrasonic welding tool can be increased during the welding process compared to flat contact surfaces of the connecting part and the ultrasonic welding tool known from the prior art, so that the process accuracy of the welding process can be increased. In particular, due to the mutually corresponding profiling and/or due to the positive interlocking of the connecting part and the ultrasonic welding tool, a welding process or a welding device can be provided that is robust with respect to production-related manufacturing tolerances of the connecting part. In particular, a variance of the welding path can be reduced so that a process-safe and reliable welding of the connecting part and conductor is made possible.

In this context, it is preferred that the mutually corresponding profilings of at least one part of the contact surface of the connecting part and of the at least one part of the contact surface of the ultrasonic welding tool are designed in such a way that the profilings can be manufactured in a process-favorable manner and also lead to a higher process accuracy during the welding of the connecting part and conductor. For example, the profiles can be jagged and/or triangular in shape.

According to an embodiment, it is proposed that the profilings are formed by substantially mutually corresponding wave-shaped profilings of at least part of the contact surfaces of the connecting part and the ultrasonic welding tool. Wave-shaped profilings are favorable to manufacture from a constructional point of view and lead to the fact that the connecting element can be arranged in a reliable manner on the ultrasonic welding tool, thus enabling a process-reliable welding between the connecting part and the conductor.

According to an embodiment, it is proposed that the profilings are formed by substantially mutually corresponding corrugated profilings of at least a part of the contact surfaces of the connecting part and the ultrasonic welding tool. Fluted profilings are favorable to manufacture from a design point of view and result in the connecting element being arrangeable on the ultrasonic welding tool in a reliable manner, thereby enabling a process-reliable weld between the connecting part and the conductor.

According to an embodiment, it is proposed that the conductor is a flat conductor or a bus bar and/or that the connecting part is a flat part. A flat conductor and/or a flat part preferably have a substantially rectangular cross-section with two narrow sides and two broad sides. The connecting part can be designed, for example, as a cable lug, as a crimp contact, as a connection lug or likewise as a conductor. Furthermore, it is preferred that the conductor, in particular the flat conductor, has an insulated region and a stripped region, wherein at least a part of the stripped region of the conductor is welded to the connecting part.

According to an embodiment, it is proposed that the connecting part is formed of an aluminum material or a copper material, in particular that the connecting part is formed of a composite material. Furthermore, it is preferred that the conductor is an aluminum stranded conductor. The ultrasonic welding process is particularly advantageous in the case of joining partners comprising at least partially aluminum, since during welding by means of ultrasound an aluminum oxide layer is broken up at the contact surface between the components to be welded.

According to an embodiment, it is proposed that the welding device comprises a further ultrasonic welding tool, that at least one part of a contact surface of the further ultrasonic welding tool contacts at least one part of a contact surface of the conductor, and that the at least one part of the contact surface of the further ultrasonic welding tool and/or the at least one part of the contact surface of the conductor has a further profiling. The further ultrasonic welding tool may be a sonotrode or an anvil. By providing the profiling and/or the profilings, a reproducible welding process can be provided which exhibits sufficient process reliability. When providing profilings each on at least a part of the contact surface of the further ultrasonic welding tool and on at least a part of the contact surface of the conductor, it is preferred that the profilings substantially correspond to each other and/or can be brought into positive engagement with each other.

According to an embodiment, it is proposed that the further profiling and/or the further profilings are formed by wave-shaped profilings, by serrated profilings or by fluted profilings. Serrated, fluted or wavy profilings are favorable to manufacture from a design point of view and result in the connecting element being arrangeable on the ultrasonic welding tool in a reliable manner, thus enabling a process-reliable welding between the connecting part and the conductor.

According to an embodiment, it is proposed that the connecting element is fixed on the ultrasonic welding tool in a force-fit manner. This can enable precise positioning of the connecting part on the ultrasonic welding tool, whereby additional process accuracy can be achieved.

BRIEF DESCRIPTION OF THE DRAWINGS

In the following, the subject matter is explained in more detail with reference to the drawings showing embodiments. The drawings show.

DETAILED DESCRIPTION OF SPECIFIC EMBODIMENTS

Figure 1:
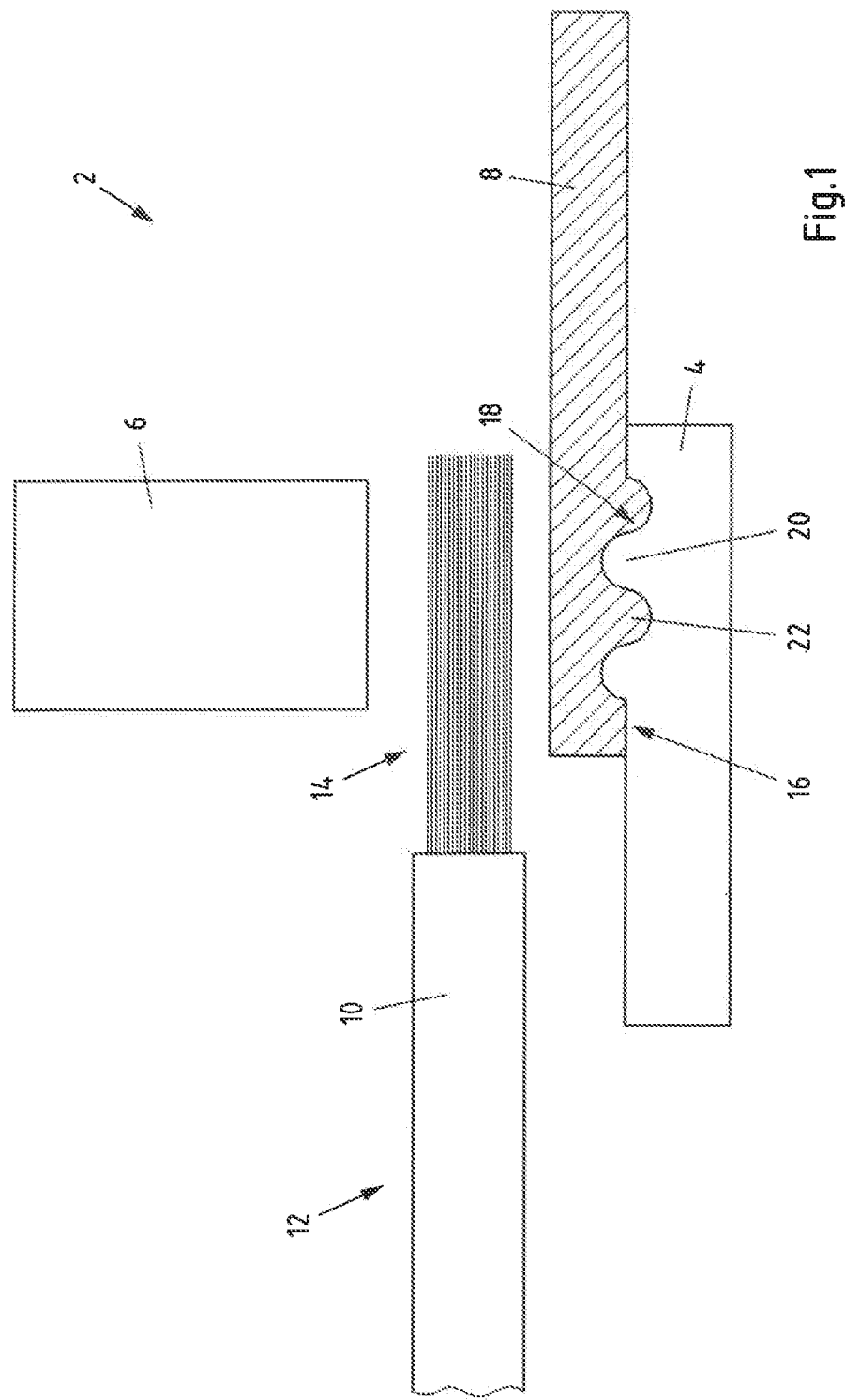
FIG. 1 a schematic view of an embodiment of a welding device.

FIG. 1 shows a welding device 2 in a schematic view comprising a lower ultrasonic welding tool 4 and an upper ultrasonic welding tool 6. The lower ultrasonic welding tool 4 can be formed, for example, as a sonotrode and the upper ultrasonic welding tool 6 as an anvil. It is also possible that the lower ultrasonic welding tool 4 is formed, for example, as an anvil and the upper ultrasonic welding tool 6 is formed as a sonotrode. A connector 8 is arranged on the lower ultrasonic welding tool 4, which is welded to a conductor 10. The conductor 10 has an insulated area 12 and a stripped area 14.

Both the connecting part 8 and the lower ultrasonic welding tool 4 have contact surfaces 16 and 18 on their surfaces facing each other. On at least a part of the contact surfaces 16 and 18, the connecting part 8 and the lower ultrasonic welding tool 4 have mutually corresponding profilings 20 and 22. The profilings 20 and 22 are wave-shaped and lead to a positive interlocking of the connecting part 8 and the lower ultrasonic welding tool 4, whereby the process accuracy can be improved during the welding process.

Figure 2:
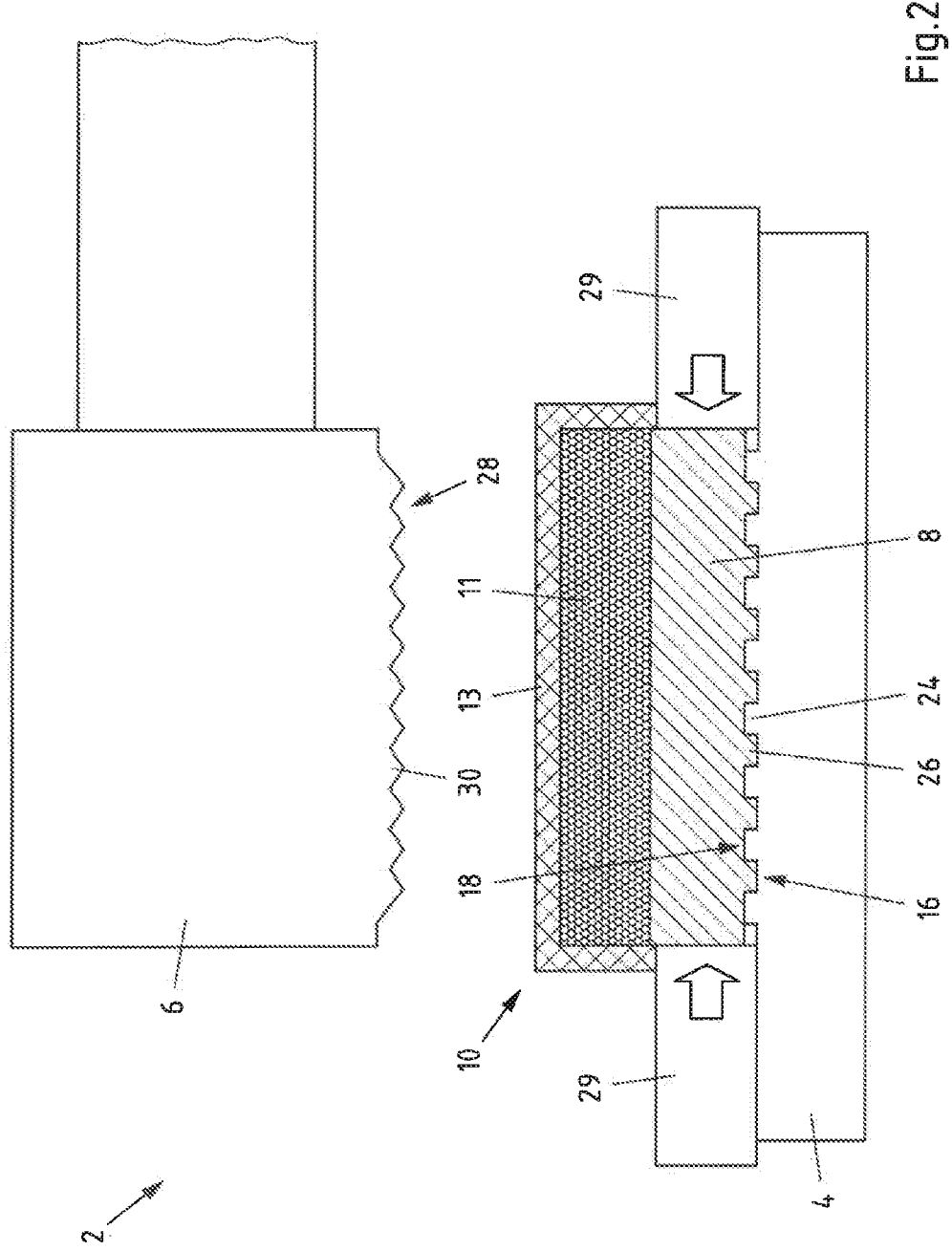
FIG. 2 shows another embodiment of a welding device in a schematic view.

FIG. 2 shows a further embodiment of a welding device 2 in a schematic view. The conductor 10 is designed as a flat conductor and has a stranded conductor 11 with an insulation 13, the insulation 13 being removed on the side to be welded to a connecting part 8. On at least a part of the contact surfaces 16 and 18, the connecting part 8 and the lower ultrasonic welding tool 4 have profiles 24 and 26 corresponding to one another, the profiles 24 and 26 being formed in a corrugated manner.

After the connecting part 8 has been arranged on the lower ultrasonic welding tool 4, the connecting part 8 is non-positively fixed with the aid of pressing means 29. The upper ultrasonic welding tool 6 has a serrated profiling 30 on at least part of its contact surface 28, with the aid of which the conductor 10 can be additionally fixed during the welding process.

What is claimed is:

1. A system comprising:
    a combination including an ultrasonic welding tool, a conductor and at least one connecting part;
    the ultrasonic welding tool having a sonotrode and an anvil, wherein a contact surface of the connecting part contacts a contact surface of the sonotrode or the anvil of the ultrasonic welding tool, wherein the connecting part is formed from a conductive material comprising aluminum and/or copper,
    wherein the contact surface of the connecting part and the contact surface of the sonotrode or the anvil of the ultrasonic welding tool have profiles corresponding at least in parts to one another, wherein the profiles are formed by substantially mutually corresponding corrugated profiles of at least part of the contact surface of the connecting part and of at least part of the contact surface of the sonotrode or the anvil of the ultrasonic welding tool,
    wherein the connecting part, the sonotrode and the anvil are arranged to receive the connecting part in between the sonotrode and the anvil and arranged to receive the conductor against the connecting part so that during ultrasonic welding the connecting part and the conductor are pressed at each other in between the sonotrode and the anvil for welding the connecting part and the conductor together; and
    a pressing tool is arranged to contact the connecting part and the pressing tool positions and fixes the connecting part on the ultrasonic welding tool between the sonotrode and the anvil.

2. The system according to claim 1, wherein
    the profiles are formed by substantially mutually corresponding wave-shaped profiles of at least part of the contact surfaces of the connecting part and of the sonotrode or the anvil of the ultrasonic welding tool.

3. The system according to claim 1, wherein
    the conductor is a flat conductor or a bus bar and/or
    the connecting part is a flat part.

4. The system according to claim 1, with at least one conductor, wherein
    a further contact surface of the sonotrode or the anvil which is not in contact with the connecting part,
    is in contact with at least part of a contact surface of the conductor, and
    at least one part of the further contact surface and the contact surface of the conductor have a further profiles.

5. The system according to claim 4, wherein
    the further profiles are formed by wave-shaped profiles, by serrated profiles or by fluted profiles.

6. Welding method for producing a material bond connection between a conductor and a connecting part, comprising:
    arranging the connecting part and the conductor on an ultrasonic welding tool between a sonotrode and an anvil of the ultrasonic welding tool, wherein the connecting part is formed from a conductive material comprising aluminum and/or copper,
    wherein a contact surface of the sonotrode or the anvil of the ultrasonic welding tool and a contact surface of the connecting part are in contact with each other,
    wherein the contact surface of the connecting part and the contact surface of the sonotrode or the anvil of the ultrasonic welding tool have profiles corresponding at least in parts to one another,
    wherein the profiles are formed by substantially mutually corresponding corrugated profiles of at least part of the contact surface of the connecting part and at least part of the contact surface of the sonotrode or the anvil of the ultrasonic welding tool,
    the connecting part and the conductor are pressed at each other in between the sonotrode and the anvil and welded together by ultrasonic welding,
    wherein the at least one part of the contact surface of the connecting part and the at least one part of the contact surface of the ultrasonic welding tool at least partially interlock along the corrugated profiles and
    the connecting part is in contact with a pressing tool and the pressing tool positions and fixes the connecting part on the ultrasonic welding tool between the sonotrode and the anvil.

* * * * *